2,864,047

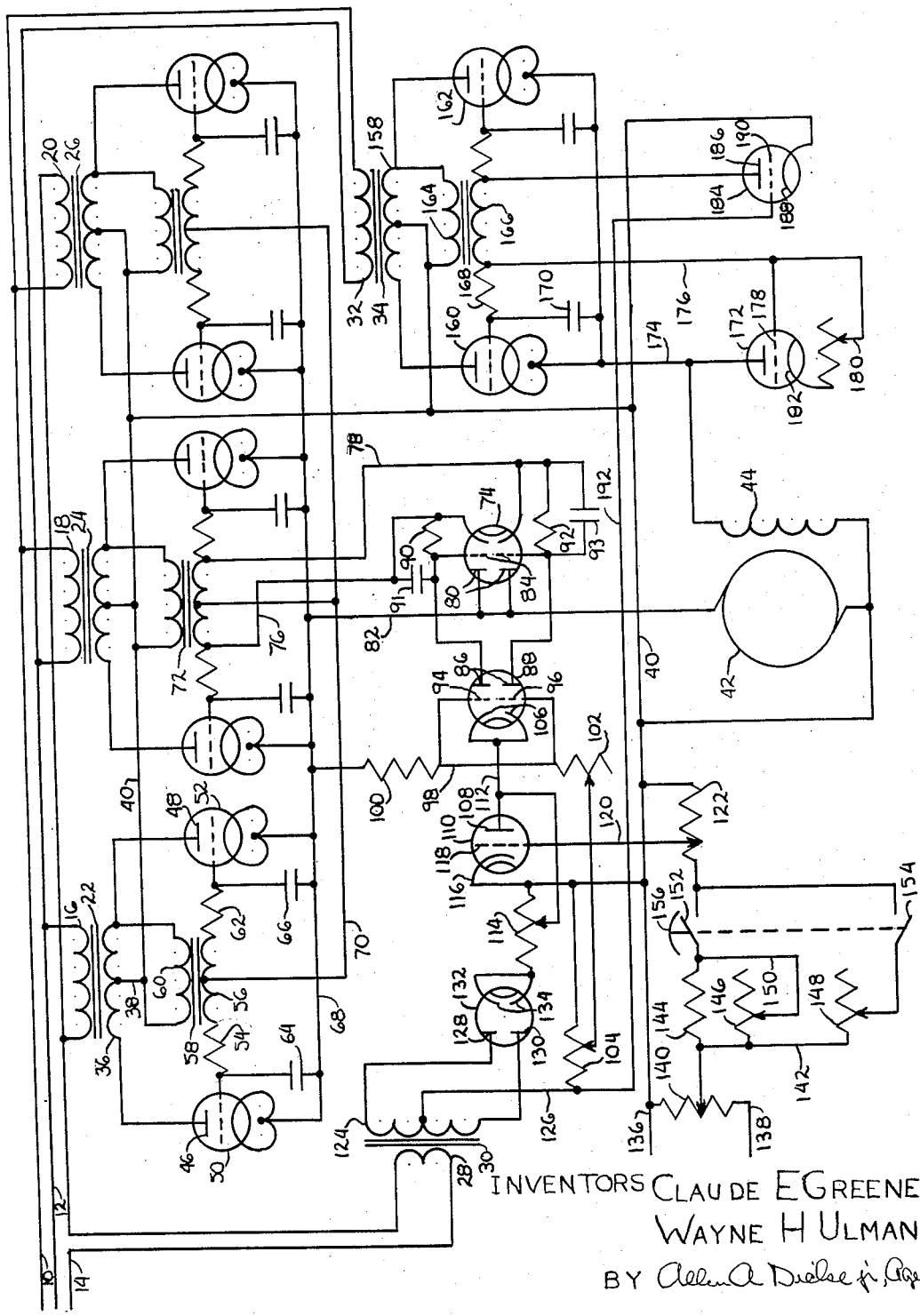

MOTOR CONTROL SYSTEM

Claude E. Greene and Wayne H. Ulman, Sidney, Ohio, assignors to The Monarch Machine Tool Co., Sidney, Ohio, a corporation of Ohio Application January 6, 1955, Serial No. 480,101

7 Claims. (Cl. 318—338)

This invention relates to a motor control system of the type having grid controlled thermionic tubes to provide motor power. Previous control systems of this nature are known, but they do not provide adequately for compensation of variables. In prior systems an increase in the load on the motor energized by such a system would cause the motor to slow down. Furthermore, the size of the previous units was limited to relatively small power output.

Thus, it is an object of the present invention to provide a novel thermionic rectifier system which overcomes the disadvantages of the prior art.

It is a further object to provide a motor control system having multiple phase powered thermionic rectifier tubes.

It is another object to provide a very simple control system to regulate all phases.

It is another object to provide proper load compensation so that the motor connected to the rectifier output may be maintained at relatively constant speed with varying loads.

It is another object to provide a stabilized field for the motor so that the usually necessary stabilizing field is rendered unnecessary. Thus, a less complex motor may be used in conjunction with this control system.

It is a further object to provide an economical system of motor control.

Other objects and advantages of the instant invention will become apparent upon the study of the attached specification and drawing in which the single figure represents a schematic electrical diagram of the motor control system.

The control system of the present invention primarily relates to a six-phase grid controlled rectifier system as is shown in the attached drawing, but it will become apparent that different numbers of phases may be readily used. The drawing shows the three phases, lines 10, 12, and 14 supplying power to the delta-connected primaries 16, 18, and 20 of the main power transformers 22, 24, and 26, respectively. It will be noted that line 14 passes through the primary 28 of a current transformer 30 which will be hereinafter described. Lines 10 and 12 are connected across the primary 32 of the power transformer 34 which supplies field energization.

Observation of the drawing shows three rectifier pairs, with each pair associated with the transformers 22, 24, and 26. In view of the fact that each of these systems is identical, only one will be described. Accordingly, it is seen that the secondary 36 of power transformer 22 is Y connected so that the center tap 38 is connected by line 40 to the center taps of the secondaries of the other power transformers. This center tap line 40 also extends to one side of the motor armature 42 and the motor field 44 and is called the negative line. The other terminals of secondary 36 are connected to the plates 46 and 48 of the grid controlled thermionic tubes 50 and 52. The grid of tube 50 is connected through a resistance 54 to the secondary 56 of an energizing transformer 58 having a primary 60. The primary is connected between one of the plate leads and the center tap line 40 to provide an alternating current wave on the grid 50. This wave is also superimposed on the grid of tube 52 through a resistance 62. Associated with the resistances 54 and 62 are capacitors 64 and 66 which shift the phase, in conjunction with the resistances, on the grids of tubes with which they are associated. The phase shift of almost 90° from the phase impressed upon the plates provides for control of the firing of these tubes. The voltage of the superimposed alternating current wave with reference to the critical voltage of the tubes will determine the firing point of the tubes and thus the net output voltage of the control system. The cathode of tube 50 is connected to a positive line 68 through appropriate filament energizing transformer. Energization of these cathodes may be through a center tap filament transformer as is indicated in the drawing, or they may be separately heated. The capacitors 64 and 66 are also connected to line 68 as is the cathode of tube 52. The line 68 supplies power to the other side of the armature 42 through line 82 and is connected to the capacitors and cathodes of the tubes and the other phases. The alternating current wave impressing transformers, of which 58 was used as an example, have their center tapped secondaries connected together by line 70 so that any voltage level impressed upon one will be communicated to the whole system and all of the main rectifier tubes will conduct substantially equally.

It is easily seen that raising or lowering the voltage level in the grid system of the rectifier tubes will cause them to fire earlier or later, and the firing is dependent upon the tube characteristics such as critical voltage and the grid voltage. In the usual triode, conduction will cause the grids to collect some electronic flow from their own cathodes and the system will have a tendency to shut itself off. The voltage of the wave impressed on the grids of tubes 50 and 52 is regulated by controlling current flow at the opposite ends of the wave transformer 72 by means of vacuum tube 74 and lines 76 and 78 which are connected to the cathodes of the tube 74. The plates 80 of tube 74 are connected together and through line 82 to the positive line 68. As the alternating current wave oscillates the secondary of transformer 72, the tube 74, when conducting, acts as a pair of half-wave rectifiers to keep the voltage level relatively high in transformer 72. The grids 84 of tube 74 are regulated by being connected to the plates 86 of the main control tube 88.

The plates 86 are also connected to the leads 76 and 78 through resistors 90 and 92 respectively, and capacitors 91 and 93 are paralleled across resistors 90 and 92, respectively. Main control tube 88 contains grids 94 and 96 which are connected together by means of line 98, and this line is connected to the positive line 68 through resistor 100. Line 98 also connects the grids through resistor 102 and potentiometer 104 to the negative power line 40. Cathodes 106 of tube 88 are connected together and to plate 108 of tube 110 by means of line 112. Line 112 is also connected to the negative line 40 through a potentiometer 114. The cathode 116 of tube 110 is connected directly to line 40. The grid 118 of tube 110 is connected by line 120 to the slide wire of potentiometer 122 which has one end connected to line 40.

The current transformer 30, having primary 28, is provided with a secondary 124 which has a center tap 126 connected to the other end of potentiometer 104. The secondary 124 has its ends connected to the plates 128 and 130 of the double rectifier tube 132. The cathodes 134 of this tube are connected together and to one end of the potentiometer 114.

An auxiliary or control direct current power supply is provided by positive line 136 which is connected to the main power line 40, and by negative line 138. The lines 136 and 138 are connected together by potentiometer 140 and the slide wire of the potentiometer is connected through line 142 to resistance 144, resistance 146, and resistance 148. The slide wire of resistance 146 and resistance 144 are connected together by line 150 which connects through switch 152 to the other end of potentiometer 122. Similarly, the slide wire of resistance 148 is connected through switch 154 to the same terminal of potentiometer 122 as line 150. The switches 152 and 154 are mechanically interconnected as shown so that only one may be closed at a time. A button 156 is schematically shown as determining which of the switches, and thus which of the resistances, will be controlling.

As noted, the previously described rectifiers supply power through lines 40 and 68 to the motor armature 42. The transformer 34 having primary 32 supplies power by means of secondary 158 to vacuum tubes 160 and 162 which supply power to the motor field 44. The secondary 158 has a center tap connected to line 40 and connected between this center tap and one lead of the secondary is a transformer primary 164. The secondary 166 of this transformer is connected to the grids of the tubes 160 and 162 to apply an A. C. wave thereto. Resistor 168 and capacitor 170 are connected to shift the phase of the wave on the grid of tube 160 almost 90° as has been described with respect to the armature power rectifier. A similar resistor and capacitor shift the phase of the wave on the grid of tube 162 in similar manner. The level of the grid voltage with respect to the critical grid voltage determines the point at which these tubes will fire or conduct electricity. A control tube 172 has its plate connected to line 174 to which are connected the cathodes of tubes 160 and 162 and the capacitors of which 170 is an example. The secondary 166 is connected by line 176 to the grid 178 of the tube 172 and to the slide wire 180 of a variable resistor which is connected to the cathode 182 of the tube 172.

Tube 172 is one portion of the field control for the field 44. The tube 184 is another portion of the system and is provided with a plate 186 which is connected to the other side of secondary 166. The cathode 188 of the tube 184 is connected to line 40 and the grid 190 is connected by means of line 192 to the center tap line 126 of the secondary 124 of the current transformer 30.

The drawing illustrates in some cases the use of center tap secondaries of filament transformer for heating various cathodes and in other cases shows separately heated cathodes. In any event, means is provided to heat the cathode from an appropriate source. The specific connections and heating means have been omitted for the purposes of clarity, for aside from the need to connect the filaments in the proper phase relationship, the filament connections are well known in the prior art.

*Operation*

The lines 10, 12, and 14 are normally connected to a suitable 3-phase source and the primaries 16, 18, and 20 are delta-connected with their associated secondaries being Y-connected. This provides a 6-phase output for the energization of the vacuum tubes described above, for which 50 and 52 were examples. The plates of the vacuum tubes are connected to the end of the Y-connected secondaries and the center taps of the secondaries are connected together and by line 40 to the motor armature 42. The other side of the motor armature is connected by line 68 to the cathodes of the rectifiers and it is clearly seen that alternating current voltage waves 60 electrical degrees apart are impressed across the rectifier tubes between the cathode and the plate.

As is well known in the grid control art, triodes have a critical value of voltage of the grid with respect to the cathodes at which the tube will commence to pass electrons. Once the conduction has started, it will continue until the voltage across the tube is reversed during the next half cycle. In the present invention, the transformer 58 is provided to supply an alternating current wave on the grids, and appropriate resistances 54 and 62 in conjunction with capacitors 64 and 66 shift the impressed phase on the grids. The level of the grid voltage is controlled, and is communicated to the other rectifiers by means of line 70. Control of the level of grid voltage is accomplished by means of tubes 74 and 88 wherein 74 permits electron flow away from the grids to overcome grid leakage and to make the grids more positive. Oppositely connected relative to tube 74 is tube 88 which has its plates 86 connected to the grids 84 and through resistances 90 and 92 to the rectifier grids. In other words, tube 88, while conducting, tends to make the grids 84 negative and prevent conduction through tube 74 and thus make the power rectifier grids negative by passing current through resistances 90 and 92. Capacitors 91 and 93 are paralleled across resistors 90 and 92 to hold over the voltage due to voltage drop across resistors 90 and 92, and thus regulate the voltage of grids 84 while tube 74 is conducting. Tube 88 thus has two means of control over tube 74. It bypasses the tube 74 through resistances 90 and 92, and also controls the grids 84. Tube 88, meanwhile, is controlled from three sources. The first source is the resistance 100 which feeds back positive voltage from the main positive line 68. For example, when the motor load is increased and the rectifier output voltage is raised, as is hereinafter described, the positive line 68 feeds the grids 94 and 96 through resistance 100 to make the grids more positive thereby increasing the conduction of the main rectifiers and the result is increased stability.

The cathodes 106 of tube 88 are connected together and through line 112 to the plate 108 of tube 110. The grid 118 of tube 110 is provided with a control signal from the system of resistors and potentiometers 140 through 148. When the switch knob 156 is raised and switch 154 is closed, the resistor 148 controls the voltage on the grid 118. Resistor 148 is manually operated and thus provides manual control for the motor armature speed. The resistor 180 is also connected to the same manual knob so that the field is also controlled as is described hereinafter.

The resistor 144 and resistor 146 provide a system wherein linear movement of the slide wire of resistor 146 will provide a hyperbolic voltage output between 142 and 150. Thus, with the switch 156 depressed, the electric system is adapted to provide a motor that will rotate at a speed which is adapted for constant surface speed use such as in the lathe art. Such a machine is shown in Patent No. 2,600,988. Resistance 146 is designed to be controlled by the cross slide of such a lathe.

It is necessary to control the voltage output of the power rectifiers under changes in load so that the speed of the motor 42 may remain relatively constant. The current transformer 30 measures the motor load and tube 132 rectifies the transformer output. The voltage signal across tube 132, and thus between the center tap line 126, and cathodes 134, is an indication of the motor load. Line 126 is connected through compensation adjustment potentiometer 104 and resistor 102 to the grids 94 and 96. Thus, an increase in motor load makes line 126 more negative and the grids 94 and 96 more negative so that the main rectifiers transmit more current. Similarly, the cathodes 134 are connected through potentiometer 114 to the cathodes 106 so that with more load on the motor the cathodes 134 and cathodes 106 become more positive for more current flow in the main rectifiers.

The field supply rectifiers 160 and 162 are also controlled by a grid voltage wave, as described. The grids become more positive by means of current flow through tube 172 which is controlled by the manually operated resistance 180. This tends to permit the tubes to increase the field current. Opposite to tube 172 is the tube 184 which tends to make the grids more negative and thus reduce the field voltage. Tube 184 is controlled from line 192 which in turn is an indication of the load on the motor. When the motor load is increased, a voltage signal is transmitted through lines 126 and 192 to cause the grid 190 to become more positive and thus the grids of the field rectifiers, 160 and 162, become more negative and the field current is reduced. This signal helps maintain motor speed.

While this invention has been described in its most preferred form, it is obvious that it is susceptible to changes in form and detail. It is thus desired that the invention be interpreted and its scope defined by the content of the appended claims.

What we claim is:

1. In a grid controlled rectifier system including a rectifier having a cathode, a grid, and a plate, means to impress an alternate current voltage between said cathode and said plate, another means to impress an alternating current voltage between said grid and said cathode to regulate the current flow through a said rectifier, a transformer having a primary and secondary, said transformer primary being connected in series with said first means to impress alternating current, said secondary thus indicating the load upon said rectifier, said secondary being connected to voltage control means for continuously controlling the voltage of said grid relative to said cathode to control the conductance of said rectifier.

2. The rectifier system of claim 1 wherein said secondary is adjustably connected to said voltage control means for adjustment of the conductance of said rectifier.

3. In a grid controlled rectifier system including a rectifier having a cathode, a grid, and a plate, means to impress an alternate current voltage between said cathode and said plate, another means to impress an alternating current voltage between said grid and said cathode to regulate the current flow through said rectifier, a transformer having a primary and secondary, said transformer primary being connected in series with said first means to impress alternating current, said secondary thus indicating the load upon said rectifier, a control rectifier tube having a plate and a cathode, said control rectifier plate and said control rectifier cathode being connected to said secondary, a main control tube having a plate, a grid and a cathode connected to adjust the voltage of said rectifier grid with respect to said rectifier cathode to control its conductance, said main control tube grid being connected to said secondary and said main control tube cathode being connected to said control rectifier cathode whereby changes in load in said primary adjust the voltage level of said main control tube grid with respect to said main control tube cathode to in turn adjust the conductance of said rectifier.

4. The structure of claim 3 further including a motor having armature and a field, said armature being connected to be energized by said first named rectifier, a controllable rectifier for energizing said field, said controllable field rectifier being connected to said secondary to be controlled thereby.

5. In a motor control system having an alternating current power supply and a thermionic grid controlled rectifier having a plate, a grid and a cathode, a motor supplied by said rectifier, means for shifting the phase of the rectifier grid relative to said supply, means to regulate the voltage of said grid with respect to said cathode to regulate the point at which the rectifier transmits current, said means including a main control tube having a plate, a grid, and a cathode, said plate being connected to said rectifier grid, said grid being connected to a resistance connected to a said rectifier cathode and said cathode being connected to the said rectifier plate whereby changes in voltage of said rectifier cathode with respect to said rectifier plate changes the main control tube grid voltage with respect to the main control tube cathode whereby the control system is self-regulating.

6. The control system of claim 5 wherein a current transformer primary is connected in series in the alternate current power supply, a secondary associated with said current transformer primary, said secondary being connected through an adjustable resistance to said main control tube grid, said secondary also being connected through adjustable resistance to said main control tube cathode whereby changes in load in said alternating current power supply, change the conductance of said rectifier.

7. In a grid controlled rectifier system having at least one rectifier tube, said rectifier tube having a cathode, a grid and a plate, means to impress an A. C. wave between said cathode and said plate, means to impress an A. C. wave substantially 90 degrees from said first wave between said cathode and said grid, and means to regulate the conduction of said rectifier by controlling the voltage of said grid relative to said cathode; said last named means including a main control tube having a plate and a grid and having its plate connected to said rectifier grid and having its grid connected to said rectifier cathode, another control tube having a plate, a grid and a cathode, said main control tube plate being connected to the cathode and grid of said another control tube, and said another control tube plate being connected to said rectifier cathode, whereby said main control tube controls said another control tube and electronic flow to said rectifier grid, and said another control tube controls electronic flow away from said rectifier grid.

References Cited in the file of this patent

UNITED STATES PATENTS

| | | |
|---|---|---|
| 1,654,937 | Knight | Jan. 3, 1928 |
| 1,847,934 | Elder et al. | Mar. 1, 1932 |
| 2,027,235 | Klemperer | Jan. 7, 1936 |
| 2,117,908 | Ikawa et al. | May 17, 1938 |
| 2,190,757 | Moyer | Feb. 20, 1940 |
| 2,504,155 | Roman | Apr. 18, 1950 |